(12) United States Patent
Duan et al.

(10) Patent No.: US 11,204,084 B2
(45) Date of Patent: Dec. 21, 2021

(54) CONTINUOUSLY VARIABLE TRANSMISSION INCLUDING A LAYSHAFT GEARSET

(71) Applicant: GM Global Technology Operations LLC, Detroit, MI (US)

(72) Inventors: Chengwu Duan, Shanghai (CN); Jian Yao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 672 days.

(21) Appl. No.: 16/079,850

(22) PCT Filed: Apr. 11, 2016

(86) PCT No.: PCT/CN2016/078953
§ 371 (c)(1),
(2) Date: Aug. 24, 2018

(87) PCT Pub. No.: WO2017/177360
PCT Pub. Date: Oct. 19, 2017

(65) Prior Publication Data
US 2021/0180667 A1  Jun. 17, 2021

(51) Int. Cl.
*F16H 37/00* (2006.01)
*F16H 37/02* (2006.01)

(52) U.S. Cl.
CPC ......... *F16H 37/021* (2013.01); *F16H 37/022* (2013.01); *F16H 2037/023* (2013.01)

(58) Field of Classification Search
CPC . F16H 37/021; F16H 37/023; F16H 2037/023
See application file for complete search history.

(56) References Cited

U.S. PATENT DOCUMENTS 4,548,100 A * 10/1985 Hohn .................... F16H 37/021
475/200
4,624,153 A  11/1986 Itoh et al.
(Continued)

FOREIGN PATENT DOCUMENTS

CN  1150936 A  6/1997

OTHER PUBLICATIONS

International Search Report and Written Opinion issued in International Application No. PCT/CN2016/078953 dated Apr. 11, 2016.

*Primary Examiner* — William C Joyce
(74) *Attorney, Agent, or Firm* — Quinn IP Law

(57) ABSTRACT

A torque transmission device (100) includes a variator of a continuously variable unit (CVU) (20) arranged in parallel with a layshaft gearset (30). The CVU (20) includes a first pulley (22) rotatably coupled to a second pulley (24), and the layshaft gearset (30) includes a first gear element (32) meshingly engaged with an intermediate gear element (34) meshingly engaged with a second gear element (36). A transmission input member (12) is rotatably coupled to the first pulley (22) of the CVU (20), and is selectively rotatably coupled to the first gear element (32) of the layshaft gearset (30) by activation of a first clutch (37). A transmission output member (14) is rotatably coupled to the second pulley (24) of the CVU (20) and rotatably coupled to the second gear element (36) of the layshaft gearset (30). The transmission is disposed to operate in a continuously variable mode when the first clutch (37) is disengaged, and to operate in a fixed gear mode when the first clutch (37) is engaged.

8 Claims, 2 Drawing Sheets

(56) References Cited

U.S. PATENT DOCUMENTS

| | | | | |
|---|---|---|---|---|
| 4,736,652 A * | 4/1988 | Shimamoto | ........... | F16H 37/021 475/206 |
| 5,720,686 A * | 2/1998 | Yan | ...................... | F16H 37/021 475/211 |
| 5,944,628 A | 8/1999 | Lee | | |
| 2009/0250278 A1 | 10/2009 | Koji et al. | | |
| 2015/0087452 A1 * | 3/2015 | Yoshino | ................ | F16H 37/021 474/1 |
| 2015/0107410 A1 * | 4/2015 | Yoshida | ................ | F16H 37/021 74/664 |
| 2015/0184728 A1 * | 7/2015 | Mordukhovich | ..... | F16H 37/021 74/664 |

\* cited by examiner

CONTINUOUSLY VARIABLE TRANSMISSION INCLUDING A LAYSHAFT GEARSET

TECHNICAL FIELD

This disclosure relates to torque transmissions, including continuously variable transmissions.

BACKGROUND

Powertrains may include an internal combustion engine that is coupled to a transmission device that includes a continuously or infinitely variable transmission (CVT) to provide tractive effort in vehicles. A characteristic of a CVT includes the capability to continuously change a speed ratio between a minimum input speed/output speed (overdrive) ratio and a maximum input speed/output speed (underdrive) ratio, thus permitting selection of engine operating points that achieve peak efficiency, e.g., a mean-best torque point, in response to an operator torque request. A continuously variable transmission is capable of steplessly changing and operating at an infinite number of effective gear ratios over a range between a maximum gear ratio and a minimum gear ratio. Under certain operating conditions, it may be desirable to operate a transmission including a CVT at a fixed gear ratio.

SUMMARY

A torque transmission device is described and includes a variator of a continuously variable unit (CVU) arranged in parallel with a layshaft gearset to transfer torque between an input member and an output member. The CVU includes a first pulley rotatably coupled to a second pulley, and the layshaft gearset includes a first gear element meshingly engaged with an intermediate gear element meshingly engaged with a second gear element. The transmission input member is rotatably coupled to the first pulley of the CVU, and is selectively rotatably coupled to the first gear element of the layshaft gearset by activation of a first clutch. The transmission output member is rotatably coupled to the second pulley of the CVU and rotatably coupled to the second gear element of the layshaft gearset. The transmission is disposed to operate in a continuously variable mode when the first clutch is disengaged, and to operate in a fixed gear mode when the first clutch is engaged.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
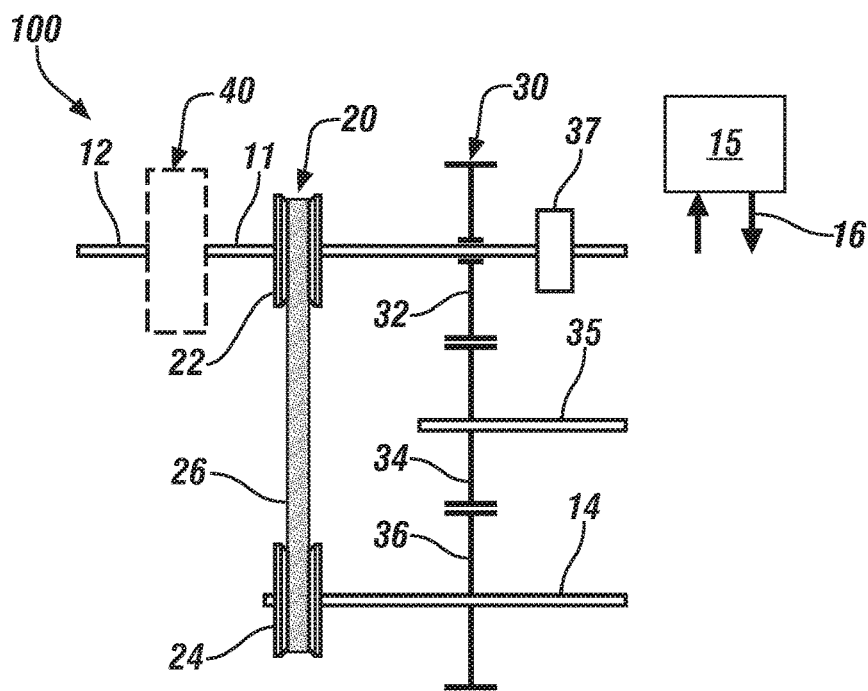
FIGS. 1, 2 and 3 each schematically illustrate a multi-mode torque transmission device including a continuously variable unit (CVU) arranged to rotate in parallel with at least one layshaft gearset transmission to transfer torque between a transmission input member and a transmission output member in either a continuously variable mode or a fixed ratio mode, in accordance with the disclosure.
Figure 2:
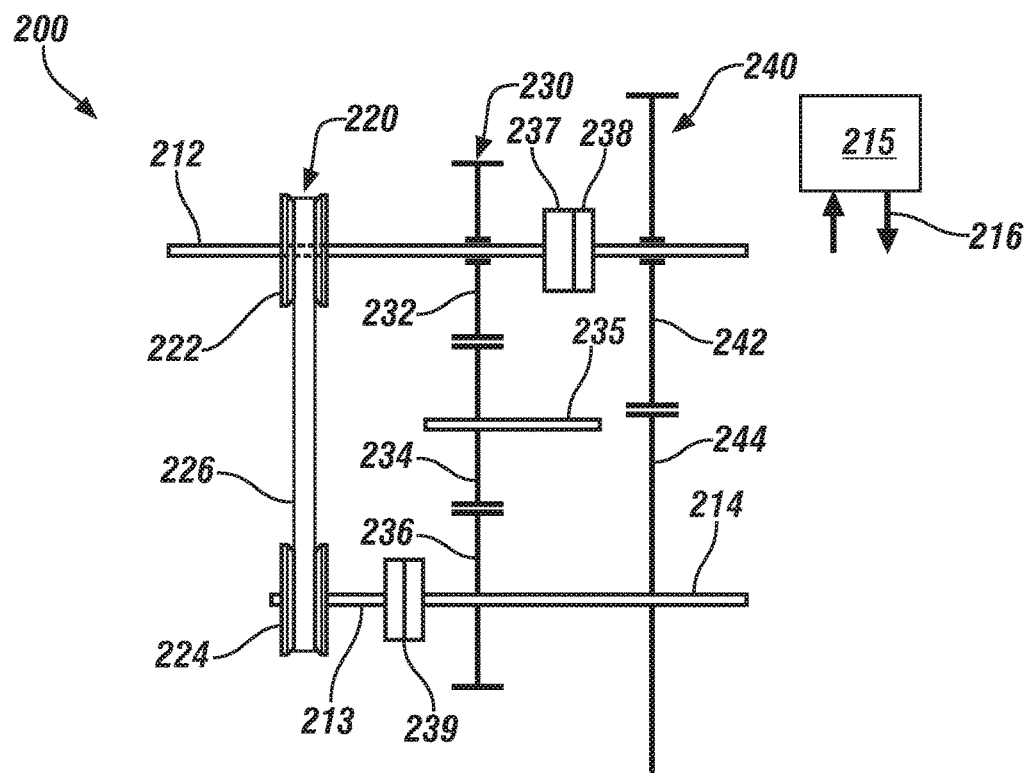
Figure 3:
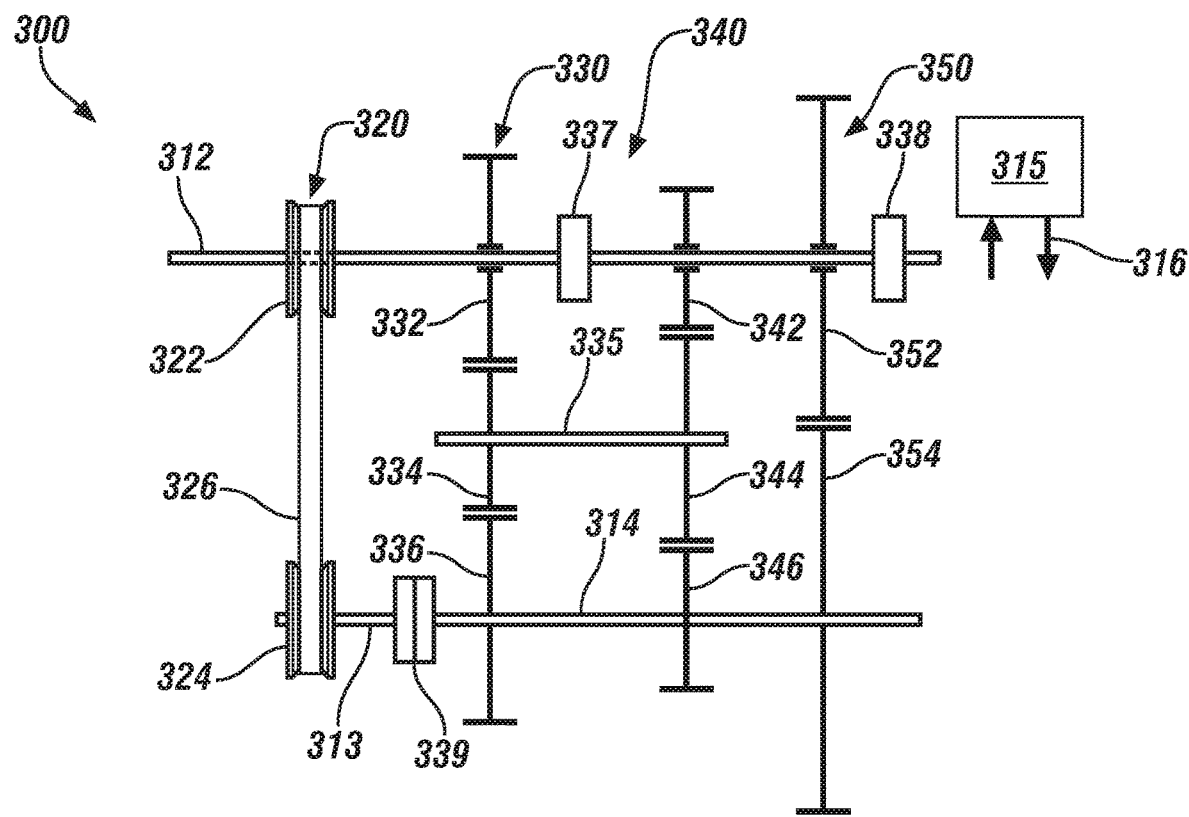

Referring now to the drawings, wherein the depictions are for the purpose of illustrating certain exemplary embodiments only and not for the purpose of limiting the same, FIGS. 1, 2 and 3 each schematically illustrate selected elements of a multi-mode torque transmission device (multi-mode transmission) that employs an embodiment of a continuously variable unit (CVU) of a continuously or infinitely variable transmission (CVT) that is arranged to rotate in parallel with one or more layshaft gearsets to transfer mechanical power in the form of torque and rotating speed between a transmission input member and a transmission output member. Operation of various controllable elements of the multi-mode transmission is controlled by a controller. Each of the embodiments of the multi-mode transmission described herein is 'multi-mode' in that it is capable of transferring torque between the transmission input member and the transmission output member in either a continuously variable mode through the CVU or a fixed-gear-ratio mode through the layshaft gearset. As is appreciated by those skilled in the art, a layshaft gearset is a gearset for transferring torque that employs an intermediate rotating member that carries one or more gears, wherein the intermediate rotating member is not otherwise rotatably coupled. As used herein, the term "selectively" is employed to describe any controller-controllable operating state, including activation and deactivation of one or a plurality of clutches. A "clutch" can be any selectively activatable and deactivatable torque transfer device that employs friction, mechanical interference or another suitable force to couple devices, including rotatably coupling coaxial devices. In one embodiment, the transmission input member couples to a torque-generative device or a prime mover such as an internal combustion engine or an electric machine. In one embodiment, the transmission output member couples to a driveline to transfer torque to tractive wheels. The controller monitors operation and controls various actuators to effect operation in the continuously variable mode through the CVU and effect operation in a fixed-gear-ratio mode through activation of one or more clutches to engage elements of the layshaft gearset.

FIG. 1 schematically shows a first embodiment of a multi-mode transmission 100 that employs a CVU 20 that is arranged to rotate in parallel with one layshaft gearset 30 to transfer mechanical power between the transmission input member 12 and the transmission output member 14. The transmission input member 12 selectively rotatably couples to a CVU input member 11 of the CVU 20 via a first gearset 40, and the CVU input member 11 rotatably couples to a first pulley 22 of the CVU 20. The first gearset 40 is configured to effect transmission operation in one of a plurality of transmission range states including, e.g., Park, Reverse, Neutral and Drive. The transmission output member 14 rotatably couples to a second pulley 24 of the CVU 20.

The first gearset 40 includes a suitable gearset and clutch configuration that is controllable to effect rotation of the CVU input member 11 in the same rotational direction as the transmission input member 12, i.e., Drive, or effect rotation of the CVU input member 11 in a rotational direction that is opposite to the rotational direction of the transmission input member 12, i.e., Reverse. The first gearset 40 may further include a clutch or other mechanism that prevents rotation of the CVU input member 11, such as in a parking situation, i.e., Park. The first gearset 40 may further include a clutch or other mechanism that permits free rotation of the CVU input member 11, such as in a neutral state, i.e., Neutral. The first gearset 40 may include a planetary gearset or another suitable gearset configuration. Devices such as the first gearset 40 are known to those skilled in the art.

The CVU 20 may employ a belt-driven variator, or alternatively, a toroidal variator or another suitable variator configuration. Belt-driven variators and toroidal variators are known and not described in detail herein. By way of a non-limiting embodiment, and as illustrated, the CVU 20 may employ a belt-driven variator that includes the first pulley 22 rotatably coupled to the second pulley 24 via a flexible continuous belt 26 that transfers torque therebetween. The first pulley 22 rotatably couples to the CVU input member 11 and the second pulley 24 rotatably couples to the transmission output member 14. In one embodiment, a hydraulic pump fluidly couples to elements of the CVU 20 to supply pressurized hydraulic fluid via a hydraulic circuit in response to control signals that are communicated via communication lines 16 from a controller 15. Other elements of the CVU 20 are known and thus not described in detail herein.

The first pulley 22 and CVU input member 11 rotate about a first axis, and the second pulley 24 and transmission output member 14 rotate about a second axis. The belt 26 may be a belt, a chain, or another suitable flexible continuous device. An input speed sensor may be arranged to monitor rotation of the CVU input member 11 to generate a variator input speed that relates to a speed of the first pulley 22, and an output speed sensor may be mounted near the transmission output member 14 to generate a variator output speed that relates to a speed of the second pulley 24. One of the first and second pulleys 22, 24 acts as a ratioing pulley to establish a speed ratio and the other of the first and second pulleys 22, 24 acts as a clamping pulley to generate sufficient clamping force to transfer torque therebetween. As used herein, the term 'speed ratio' refers to a variator speed ratio, which is a ratio of the variator output speed and the variator input speed. An underdrive speed ratio occurs when rotational speed of the variator output speed is less than the rotational speed of the variator input speed, and an overdrive speed ratio occurs when rotational speed of the variator output speed is greater than the rotational speed of the variator input speed.

In certain embodiments, each of the first and second pulleys 22, 24 may be split perpendicular to its axis of rotation to define an annular first groove that is formed between a moveable sheave and a stationary sheave. The moveable sheave axially moves or translates along the axis of rotation relative to the stationary sheave. The stationary first sheave is disposed opposite the moveable first sheave. The moveable first sheave and the stationary first sheave each include a first groove surface. The first groove surfaces of the moveable first sheave and the stationary first sheave are disposed opposite each other to define an annular groove therebetween. The opposed grooved surfaces preferably form an inverted frustoconical shape such that a movement of the moveable sheave towards the stationary sheave increases an outer pulley diameter of the annular first groove. An actuator is arranged with the pulley to control an axial position of the moveable sheave in response to a drive signal, including urging the moveable sheave towards the stationary sheave. In one embodiment, the actuator is a hydraulically-controlled device, e.g., a valve that fluidly couples to the hydraulic circuit and the drive signal is a hydraulic pressure signal. Other elements, such as clutch assemblies in the form of selectable one-way clutches and the like may be deployed between the CVU 20 and other powertrain and driveline components and systems.

The layshaft gearset 30 preferably includes first gear element 32 that is meshingly engaged with an intermediate or lay gear element 34 that is rotating on shaft 35 and meshingly engaged with a second gear element 36. Each of the first gear element 32, lay gear element 34 and second gear element 36 may be configured as an involute gear, a helical gear, a face gear, or another suitable gear configuration. The layshaft gearset 30 may be configured to transfer mechanical power in either an overdrive (OD) state, a constant state, or an underdrive (UD) state between the transmission input member 12 and the transmission output member 14, depending upon the gear ratios of the first gear element 32, lay gear element 34 and second gear element 36. Gear ratios of the first gear element 32, lay gear element 34 and second gear element 36 may be selected during development, and are based upon device and application-specific criteria.

Clutch 37 is arranged to rotatably couple the first gear element 32 of the layshaft gearset 30 to the CVU input member 11 when activated, and decouple rotation of the first gear element 32 of the layshaft gearset 30 from the CVU input member 11 when deactivated. In one embodiment, clutch 37 is a dog clutch that includes meshing elements that selectively engage to effect rotation. A dog clutch is an intermeshing clutch that is able to couple rotation and torque transfer between two members by meshing complementary splines of respective elements of the two members when their rotational speeds are synchronized, as is known by those skilled in the art. Alternatively, clutch 37 may be a selectable one-way clutch, or another clutch device that mates meshable elements. Preferably, clutch 37 is not a friction clutch so as to minimize space requirements and control complexity. The transmission output member 14 is rotatably coupled to the second gear element 36 of the layshaft gearset 30 and to the second pulley 24 of the CVU 20.

The transmission 100 operates in a continuously variable mode when the first clutch 37 is deactivated, and operates in a fixed gear mode when the first clutch 37 is activated. Clutch activation to effect operation in various transmission range states including Park, Reverse, Neutral, Drive-CVT mode and Drive-Fixed Ratio mode, is shown with reference to Table 1, below, wherein clutch activation is indicated by 'X'.

TABLE 1

| Range State | Clutch 1 |
| --- | --- |
| Park | |
| Reverse | |
| Neutral | |
| Drive - CVT | |
| Drive - Fixed Ratio | X |

The controller 15 monitors sensor inputs and executes control routines to determine control parameters for actuators to control operation of various powertrain elements. Driver input devices such as an accelerator pedal and associated accelerator pedal position sensor can be monitored to determine an operator torque request. Various sensors are suitably positioned for sensing and providing signals, including, e.g., an input speed sensor for monitoring rotation of the transmission input member 12, variator speed sensor(s) for monitoring the CVU 20 and an output speed sensor for monitoring rotation of the transmission output member 14. The input speed sensor and output speed sensor may be any suitable rotation position/speed sensing device, such as a Hall-effect sensor. The controller 15 may include digital processing capability that issues control signals based on input signals such as vehicle speed and engine torque. The controller 15 is shown as a single device for ease of illustration. Those skilled in the art appreciate that the controller 15 may be a unitary controller or a plurality of controllers that are disposed to control operation of various elements of the powertrain system. By way of non-limiting examples, there may be one or multiple controllers that are arranged to monitor and control operation of the prime mover, and one or multiple controllers that are arranged to monitor and control operation of the transmission 100.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, shown as element 16. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

FIG. 2 schematically shows a second embodiment of the multi-mode transmission 200 that employs a CVU 220 that is arranged to rotate in parallel with one layshaft gearset 230 and a second gearset 240 to transfer mechanical power between the transmission input member 212 and the transmission output member 214. The second embodiment includes a variator of a CVU 220 that is arranged in parallel with a layshaft gearset 230, which is arranged in parallel with the second gearset 240 between the transmission input member 212 and the transmission output member 214. The transmission input member 212 selectively rotatably couples to a first pulley 222 of the CVU 220, and the transmission output member 214 rotatably couples via a third clutch 239 to a second rotatable member 213 that rotatably couples to a second pulley 224 of the CVU 220. The CVU 220 may employ a belt-driven variator, or alternatively, a toroidal variator or another suitable variator configuration, and is analogous to the CVU 20 described with reference to FIG. 1, including, by way of non-limiting example, a belt-driven variator that includes the first pulley 222 rotatably coupled to the second pulley 224 via a flexible continuous belt 226 that transfers torque therebetween.

The layshaft gearset 230 preferably includes first gear element 232 that is meshingly engaged with an intermediate or lay gear element 234 that is rotating on shaft 235 and is meshingly engaged with a second gear element 236. Each of the first gear element 232, lay gear element 234 and second gear element 236 may be configured as an involute gear, a helical gear, a face gear, or another suitable gear configuration. The layshaft gearset 230 may be configured to transfer mechanical power in either an overdrive (OD) state, a constant state, or an underdrive (UD) state, depending upon the gear ratios of the first gear element 232, lay gear element 234 and second gear element 236.

The second gearset 240 preferably includes a fourth gear element 242 that is meshingly engaged with a fifth gear element 244. The fourth gear element 242 is arranged to rotate in concert with the transmission input member 212 by activation of a second clutch 238. The fifth gear element 244 is rotatably coupled to the transmission output member 214. Each of the fourth and fifth gear elements 242, 244 may be configured as an involute gear, a helical gear, a face gear, or another suitable gear configuration. The second gearset 240 transfers mechanical power in Reverse when the second clutch 238 is activated and the first and third clutches 237, 239 are deactivated.

First clutch 237 is arranged to rotatably couple the first gear element 232 of the layshaft gearset 230 to the input member 212 when activated, and decouple rotation of the first gear element 232 of the layshaft gearset 230 from the input member 212 when deactivated. In one embodiment, first clutch 237 is a dog clutch that includes meshing elements that selectively engage to effect rotation. Alternatively, first clutch 237 may be a selectable one-way clutch, or another clutch device that mates meshable elements. The second clutch 238 is arranged to rotatably couple the fourth gear element 242 and the transmission input member 212. A third clutch 239 is arranged to rotatably couple the second rotatable member 213 and the transmission output member 214 when activated, wherein the second rotatable member 213 rotatably couples to the second pulley 224 of the CVU 220. Preferably, first and second clutches 237, 238 are not friction clutches so as to minimize space requirements and control complexity. The transmission output member 214 is rotatably coupled to the second gear element 236 of the layshaft gearset 230 and to the fifth gear element 244 of the second gear set 240, and both are rotatably coupled to the second rotatable member 213 that rotatably couples to the second pulley 224 of the CVU 220 when the third clutch 239 is activated. The transmission 200 operates in a continuously variable mode when the third clutch 239 is activated and the first and second clutches 237, 238 are deactivated. The transmission 200 operates in a fixed gear mode when the first and third clutches 237, 239 are activated and the second clutch 238 is deactivated.

Controller 215 is analogous to the controller 15 described with reference to FIG. 1, and monitors sensor inputs and executes control routines via communication lines 216 to determine control parameters for actuators to control operation of various powertrain elements including first, second and third clutches 237, 238 and 239. Clutch activation to effect operation in various transmission range states including Park, Reverse, Neutral, Drive-CVT mode, and Drive-Fixed Ratio mode, is shown with reference to Table 2, below, wherein clutch activation is indicated by 'X'.

TABLE 2

| Range State | Clutch 1 | Clutch 2 | Clutch 3 |
|---|---|---|---|
| Park | | | X |
| Reverse | | X | |
| Neutral | | | X |
| Drive - CVT | | | X |
| Drive - Fixed Ratio | X | | X (optional) |

FIG. 3 schematically shows a third embodiment of the multi-mode transmission that employs a CVU that is arranged to rotate in parallel with first and second layshaft gearsets to transfer mechanical power between the transmission input member 312 and the transmission output member 314. The third embodiment includes a variator of a CVU 320 that is arranged in parallel with a first layshaft gearset 330, a second layshaft gearset 340 and a third gearset 350 between the transmission input member 312 and the transmission output member 314. The transmission input member 312 selectively rotatably couples to a first pulley 322 of the CVU 320, and the transmission output member 314 rotatably couples via a third clutch 339 to a second rotatable member 313 that rotatably couples to a second pulley 324 of the CVU 320. The CVU 320 may employ a belt-driven variator, or alternatively, a toroidal variator or another suitable variator configuration, and is analogous to the CVU 20 described with reference to FIG. 1, including, by way of non-limiting example, a belt-driven variator that includes the first pulley 322 rotatably coupled to the second pulley 324 via a flexible continuous belt 326 that transfers torque therebetween.

The first layshaft gearset 330 preferably includes first gear element 332 that is meshingly engaged with a first intermediate or lay gear element 334 that is meshingly engaged with a second gear element 336. Each of the first gear element 332, first lay gear element 334 and second gear element 336 may be configured as an involute gear, a helical gear, a face gear, or another suitable gear configuration. The first layshaft gearset 330 may be configured to transfer mechanical power in an underdrive (UD) state, the magnitude of which depends upon the gear ratios of the first gear element 332, the first lay gear element 334 and the second gear element 336.

The second layshaft gearset 340 preferably includes third gear element 342 that is meshingly engaged with a second intermediate or lay gear element 344 that is meshingly engaged with a fourth gear element 346. The first lay gear element 334 of the first layshaft gearset 330 and the second lay gear element 344 of the second layshaft gearset 340 are rotatably coupled via a common rotatable member 335. Each of the third gear element 342, second lay gear element 344 and fourth gear element 346 may be configured as an involute gear, a helical gear, a face gear, or another suitable gear configuration. The second layshaft gearset 340 may be configured to transfer mechanical power in an overdrive (OD) state, the magnitude of which depends upon the gear ratios of the third gear element 342, the second lay gear element 344 and the fourth gear element 346.

The third gearset 350 preferably includes a fifth gear element 352 that is meshingly engaged with a sixth gear element 354. The fifth gear element 352 is arranged to rotate in concert with the transmission input member 312 by activation of a second clutch 338. The sixth gear element 354 is rotatably coupled to the transmission output member 314. Each of the fifth and sixth gear elements 352, 354 may be configured as an involute gear, a helical gear, a face gear, or another suitable gear configuration. The third gearset 350 may be configured to transfer mechanical power in Reverse when the second clutch 338 is activated and the first and third clutches 337, 339 are deactivated.

A first clutch 337 is a two-stage clutch that is arranged to rotatably couple the first gear element 332 of the first layshaft gearset 330 to the input member 312 when activated in a first (left) state. The first clutch 337 is arranged to rotatably couple the third gear element 342 of the second layshaft gearset 340 to the input member 312 when activated in a second (right) state. The first clutch 337 is arranged to decouple rotation of the first gear element 332 of the first layshaft gearset 330 and decouple rotation of the third gear element 342 of the second layshaft gearset 340 from the input member 312 when deactivated. In one embodiment, first clutch 337 is a dual-sided dog clutch that includes meshing elements that selectively engage to effect rotation. Alternatively, first clutch 337 may be a selectable one-way clutch, or another clutch device that mates meshable elements and has dual activation capability. The second clutch 338 is arranged to rotatably couple the fifth gear element 352 and the transmission input member 312 when activated. A third clutch 339 is arranged to rotatably couple the second rotatable member 313 and the transmission output member 314 when activated, wherein the second rotatable member rotatably couples to the second pulley 324 of the CVU 320. Preferably, first and second clutches 337, 338 are not friction clutches so as to minimize space requirements and control complexity. The transmission output member 314 is rotatably coupled to the second gear element 336 of the first layshaft gearset 330, the fourth gear element 346 of the second layshaft gearset 340, and to the sixth gear element 354 of the second layshaft gearset 340, and both are rotatably coupled to the second rotatable member 313 that rotatably couples to the second pulley 324 of the CVU 320 when the third clutch 339 is activated.

Transmission 300 operates in a continuously variable mode when the first and second clutches 337, 338 are deactivated and the third clutch 339 is activated. The transmission operates in a fixed gear state in the UD state when the first clutch 337 is activated in the first (left) state, the third clutch 339 is activated and the second clutch 338 is deactivated. The transmission operates in a fixed gear state in the OD state when the first clutch 337 is activated in the second (right) state, the third clutch 339 is activated and the second clutch 338 is deactivated.

The controller 315 is analogous to the controller 15 described with reference to FIG. 1, and monitors sensor inputs and executes control routines via communication lines 316 to determine control parameters for actuators to control operation of various powertrain elements including first, second and third clutches 337, 338 and 339. Clutch activation to effect operation in various transmission range states including Park, Reverse, Neutral, Drive-CVT, Drive-Fixed Ratio (UD), and Drive-Fixed Ratio (OD), is shown with reference to Table 3, below, wherein clutch activation is indicated by 'X'.

TABLE 3

| Range State | Clutch 1-Left | Clutch 1-Right | Clutch 2 | Clutch 3 |
|---|---|---|---|---|
| Park | | | | X |
| Reverse | | | X | |
| Neutral | | | | X |
| Drive - CVT Mode | | | | X |
| Drive - Fixed Ratio (UD) | X | | | X (optional) |
| Drive - Fixed Ratio (OD) | | X | | X (optional) |

The concepts described herein provide a hardware configuration to bypass CVT friction path using layshaft gearsets and synchronizers at the selected gear ratio(s) to enable improved mechanical efficiency. The layshaft gearsets can provide higher efficiency compared to friction drive at the selected gear ratio(s). Layshaft gearsets, together with dog clutches, are more compact than planetary gears and friction plate clutches, and the drag loss of a synchronizer is smaller than friction plate clutches. The gains in transmission efficiency associated with the system described herein are manifested in terms of reduced pumping losses, reduced spin losses, reduced CVU belt losses and reduced final drive torque losses when operating in the fixed ratio mode in either the underdrive state or the overdrive state. Such a configuration facilitates combining CVU operation and fixed UD and OD gears for improved powertrain efficiency during highway driving and city driving (including stop-start driving), and permits reduced CVU size and ratio configurations.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A torque transmission device for a powertrain system, comprising:
   a variator of a continuously variable unit (CVU) arranged in parallel with a first layshaft gearset, a second layshaft gearset, and a third gearset to transfer torque between a transmission input member and a transmission output member;
   the CVU including a first pulley rotatably coupled to a second pulley;
   the first layshaft gearset including a first gear element meshingly engaged with a first intermediate gear element meshingly engaged with a second gear element;
   the second layshaft gearset including a third gear element meshingly engaged with a second intermediate gear element meshingly engaged with a fourth gear element;
   the first intermediate gear element rotatably coupled to the second intermediate gear element;
   the transmission input member rotatably coupled to the first pulley of the CVU;
   the transmission input member selectively rotatably coupled to the first gear element of the first layshaft gearset by a first clutch and selectively rotatably coupled to the third gear element of the second layshaft gearset by the first clutch;
   the transmission input member selectively rotatably coupled to a fifth gear element of the third gearset by a second clutch;
   the transmission output member rotatably coupled to a sixth gear element of the second gearset, rotatably coupled to the second gear element of the first layshaft gearset, and rotatably coupled to the fourth gear element of the second layshaft gearset; and
   the transmission output member selectively rotatably coupled to the second pulley of the CVU by a third clutch.

2. The torque transmission device of claim 1, wherein the transmission is disposed to operate in a continuously variable mode when the third clutch is activated and the first and second clutches are deactivated.

3. The torque transmission device of claim 1, wherein the transmission is disposed to operate in a first fixed gear mode when the first clutch is activated to couple rotation of the first gear element of the first layshaft gearset and the transmission input member, the third clutch is activated and the second clutch is deactivated.

4. The torque transmission device of claim 3, wherein the first fixed gear mode is an underdrive mode.

5. The torque transmission device of claim 1, wherein the transmission is disposed to operate in a fixed gear mode when the first clutch is activated to couple rotation of the third gear element of the second layshaft gearset and the transmission input member, the third clutch is activated and the second clutch is deactivated.

6. The torque transmission device of claim 5, wherein the fixed gear mode is an overdrive mode.

7. The torque transmission device of claim 1, wherein the transmission is disposed to operate in a reverse direction when the first and third clutches are deactivated and the second clutch is activated.

8. The torque transmission device of claim 7, wherein the transmission is disposed to operate in a continuously variable mode when operated in the reverse state.

\* \* \* \* \*